J. M. Chritton,
Churn.
No. 61,160.  Patented Jan. 15, 1867.
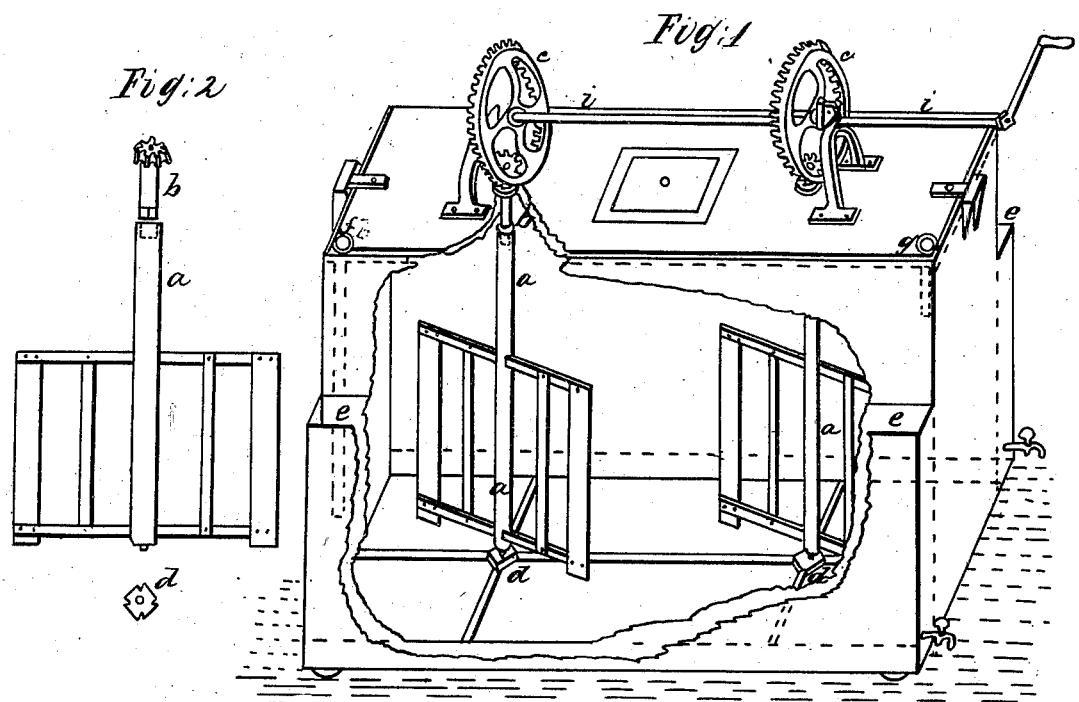
Witnesses
Tho' H. Hutchins
J. B. Cochrane
Inventor
James M. Chritton

United States Patent Office.

JAMES M. CHRITTON, OF JOLIET, ILLINOIS.

Letters Patent No. 61,160, dated January 15, 1867.

---

IMPROVEMENT IN CHURNS.

---

The Schedule referred to in these Letters Patent and making part of the same.

---

Be it known that I, JAMES M. CHRITTON, of the town of Joliet, in Wills county, and State of Illinois, have invented a new and useful Improvement on a Churn; and I do hereby declare that the following is a full, clear, and exact description of the construction and operation of the same, reference being had to the annexed drawings, making a part of this specification, in which—

Figure 1 is a perspective view; and
Figure 2, a sectional view of a part.

In order to enable others skilled in the art to make and use my invention, I will proceed to describe the same.

I use two vertical revolving dashers, marked $a$, which revolve by means of the pinion $b$ at the upper end, which meshes into the main wheel $c$, as shown in fig. 1; both dashers, revolve in the same direction, and by means of the peculiar shape of the beaters, cause the cream to rise from the bottom next to the walls of the churn, and fall over between the beaters and the dasher, thus forming a sort of revolution. The dashers, both turning the same way, form a cross-motion in relation to each other, which cuts the cream more effectually in the centre of the churn than would be done if they turned in opposite directions. In order to facilitate the cleaning of the parts, I set the lower end of the dasher into the movable box $d$, fig. 2, which is held into its place by projections on the bottom of the churn, and for disengaging the dashers from the pinion at the top, the shaft of the pinion $b$ is set in boxing in the lid of the churn, the lower end projecting below, so that the square end of the same sets loosely into a corresponding socket in the upper end of the dasher, so it can be removed at will. Instead of putting hot or cold water into the cream, as is ordinarily done to hasten the butter, I put the water into pockets, $e$, on the sides of the churn, there being a thin metal partition between the water and cream. In order to diffuse air through the cream I use tubes, $f$ and $g$, placed in the churn in opposite corners, one of which passes down into the cream, while the other does not touch the cream; the principle of which is, that, as the cream rushes past the end of the long tube, the air is drawn down into the cream, and rises to pass out through the short one. By removing the key on the top of the box $h$, in which the main shaft, $i$, rests, the main shaft can be moved so as to disengage the main wheels from the pinions, so they may be taken out of the lid to be cleaned, or to more easily place the end of the pinion-shaft into the upper end of the dashers, as stated.

Claim.

What I claim as new in my invention, and desire to secure by Letters Patent, is—

The water pockets $e$ in combination with the movable box $d$, the movable pinion and shaft $b$, and the air-tubes $f$ and $g$, when constructed and operating substantially as described.

JAMES M. CHRITTON.

Witnesses:
THOS. H. HUTCHINS,
F. B. COCHRANE.